(12) United States Patent
Chen et al.

(10) Patent No.: US 6,969,131 B2
(45) Date of Patent: Nov. 29, 2005

(54) COMPUTER ENCLOSURE WITH PERPENDICULAR EXPANSION SLOTS

(75) Inventors: Jung-Chi Chen, Tu-Cheng (TW); Kuo-Chih Lin, Tu-Cheng (TW); Xi-Hua Jiang, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 15 days.

(21) Appl. No.: 10/417,632

(22) Filed: Apr. 16, 2003

(65) Prior Publication Data

US 2004/0207297 A1    Oct. 21, 2004

(30) Foreign Application Priority Data

Dec. 13, 2002 (CN) .............................. 91220202 U

(51) Int. Cl.⁷ .............................................. H05K 7/18
(52) U.S. Cl. .................................................. 312/223.2
(58) Field of Search ......................... 312/223.2, 265.5, 312/257.1; 361/683, 684, 685, 686

(56) References Cited

U.S. PATENT DOCUMENTS

| | | | |
|---|---|---|---|
| 5,347,430 A * | 9/1994 | Curlee et al. ............... | 361/816 |
| 5,650,911 A * | 7/1997 | Scholder et al. ............ | 361/684 |
| 5,748,442 A * | 5/1998 | Toor ............................ | 361/685 |
| 5,808,237 A * | 9/1998 | Hancock ..................... | 174/35 R |
| 6,247,767 B1 * | 6/2001 | Liu et al. ................... | 312/223.2 |
| 6,318,823 B1 * | 11/2001 | Liao ........................... | 312/223.2 |
| 6,330,139 B1 * | 12/2001 | Liao ............................ | 361/86 |
| 6,341,072 B1 * | 1/2002 | Liao ............................ | 361/825 |
| 6,473,295 B2 * | 10/2002 | Chen ........................... | 361/683 |
| 6,550,877 B1 * | 4/2003 | Anderson et al. ......... | 312/223.2 |
| 2004/0105222 A1 * | 6/2004 | Chen et al. ................. | 361/683 |

* cited by examiner

Primary Examiner—Janet M. Wilkens
(74) Attorney, Agent, or Firm—Wei Te Chung

(57) ABSTRACT

A computer enclosure includes a chassis (10) having bottom, side and rear panels (20, 30, 40), and first and second mounting brackets (50, 60) attached to the chassis. The bottom panel forms a rib (21). The rear panel defines a horizontal opening (42) and an engaging portion (44). Latch slots (32) are defined in the side panel. The first mounting bracket includes a vertical expansion slot (53), a bent plate (54) and a blocking tab (55). The second mounting bracket includes: a top plate (61) having latches (612) engaging in the latch slots, and catches (613) sandwiching a top edge portion of the rear panel; and a rear plate (62) having horizontal expansion slots (621), a hook (622) slidably engaging with the bent plate, a stop plate (626) abutting against the engaging portion, a stop portion (625) abutting against the rib, and a projection (624) engaging with the blocking tab.

19 Claims, 6 Drawing Sheets

COMPUTER ENCLOSURE WITH PERPENDICULAR EXPANSION SLOTS

BACKGROUND OF THE INVENTION

1. Field of the Invention

The present invention relates to computer enclosures, and particularly to a computer enclosure having mounting brackets for receiving of expansion cards of great height in the enclosure.

2. Related Art

Many contemporary computer systems comprise not only a motherboard, but also one or more expansion cards which provide specialized functions. A rear panel of a personal computer system enclosure typically defines a plurality of expansion slots therein. Each expansion card typically comprises a slot cover attached at one of the expansion slots, to correctly position the corresponding expansion card. Such expansion slots are disclosed in U.S. Pat. Nos. 5,564,930 and 6,349,029. The expansion slots are defined perpendicular to the motherboard, because the expansion cards are perpendicularly attached to the motherboard. Some expansion cards extend very long distances from the motherboard. For such expansion cards, more space in the enclosure in a direction perpendicular to the motherboard must be reserved. Thus, a size of the computer enclosure is inevitably increased. This militates against the modem trend toward reducing the size of a computer.

An improved configuration for a computer enclosure which overcomes the above-mentioned problems is desired.

SUMMARY OF THE INVENTION

Accordingly, an object of the present invention is to provide an apparatus for mounting of expansion cards of great height in a computer enclosure.

Another object of the present invention is to provide a computer enclosure having a relatively small size.

To achieve the above-mentioned objects, a computer enclosure in accordance with a preferred embodiment of the present invention comprises a chassis, and respective first and second mounting brackets attached to the chassis. The chassis comprises a bottom panel, and respective side and rear panels extending from two contiguous sides of the bottom panel. A rib is formed on the bottom panel. A pair of latch slots is defined in a top ledge portion of the side panel. A horizontal opening is defined in the rear panel. An engaging portion is defined at one side of the rear panel adjacent the opening. The first mounting bracket defines a vertical expansion slot therein. A bent plate and a blocking tab are arranged at a side edge of the first mounting bracket. The second mounting bracket comprises a top plate and a rear plate depending from a rear end of the top plate. A pair of horizontal expansion slots is defined in the rear plate. The vertical and horizontal expansion slots can be covered over by slot covers of corresponding expansion cards received in the enclosure. The top plate comprises a plurality of latches at a lateral side thereof engaging in the latch slots, and a plurality of catches at a rear edge thereof sandwiching a top edge portion of the rear panel. The rear plate comprises a hook slidably engaging with the bent plate, a stop plate abutting against the engaging portion, a stop portion abutting against the rib, and a projection engaging with the blocking tab.

Other objects, advantages and novel features of the present invention will be drawn from the following detailed description of preferred embodiments of the present invention with the attached drawings, in which:

DESCRIPTION OF THE PREFERRED EMBODIMENTS

Figure 1:
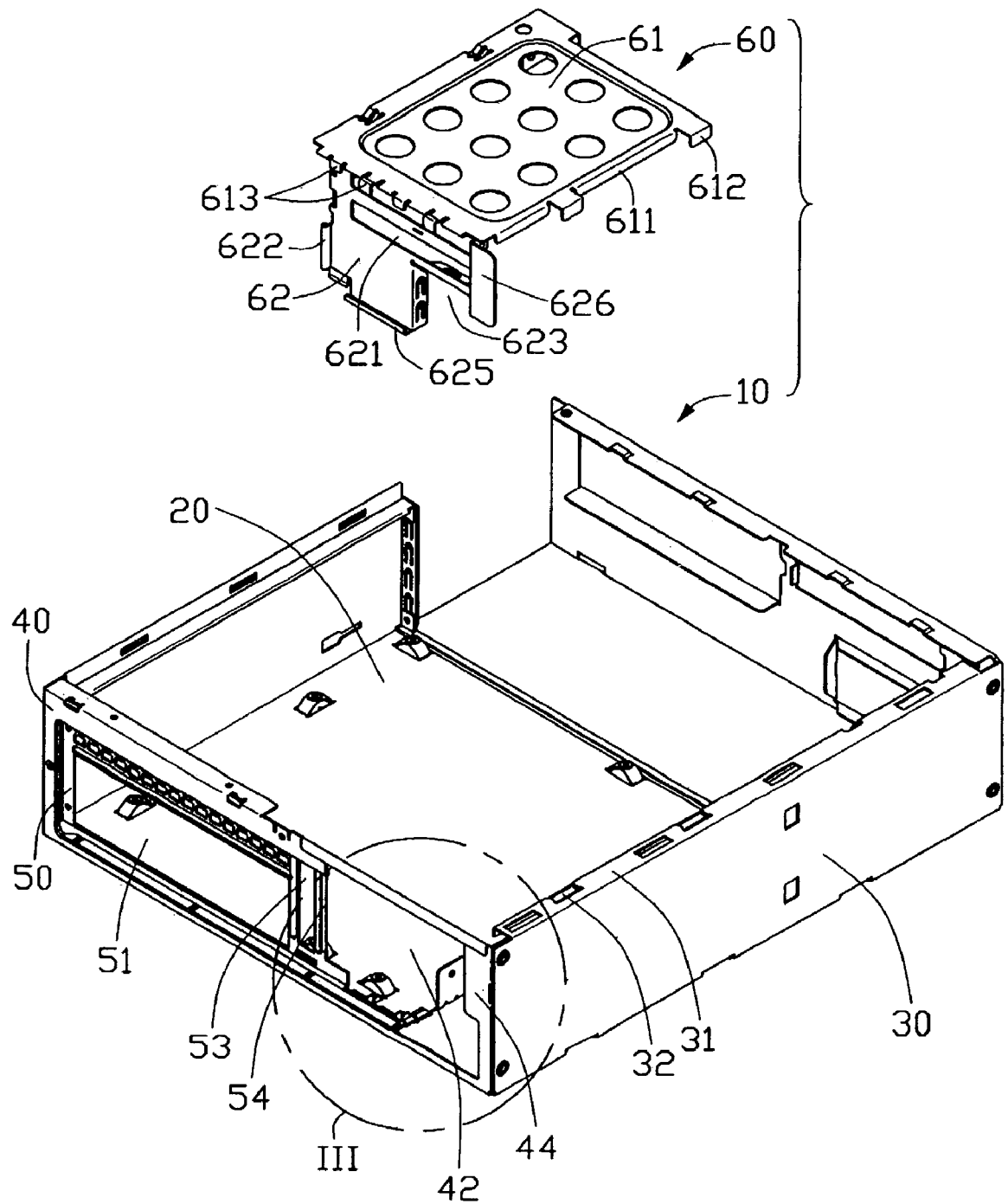
FIG. 1 is an exploded, isometric view of a computer enclosure in accordance with the preferred embodiment of the present invention, the computer enclosure comprising a chassis, and respective first and second mounting brackets attached to the chassis.
Figure 2:
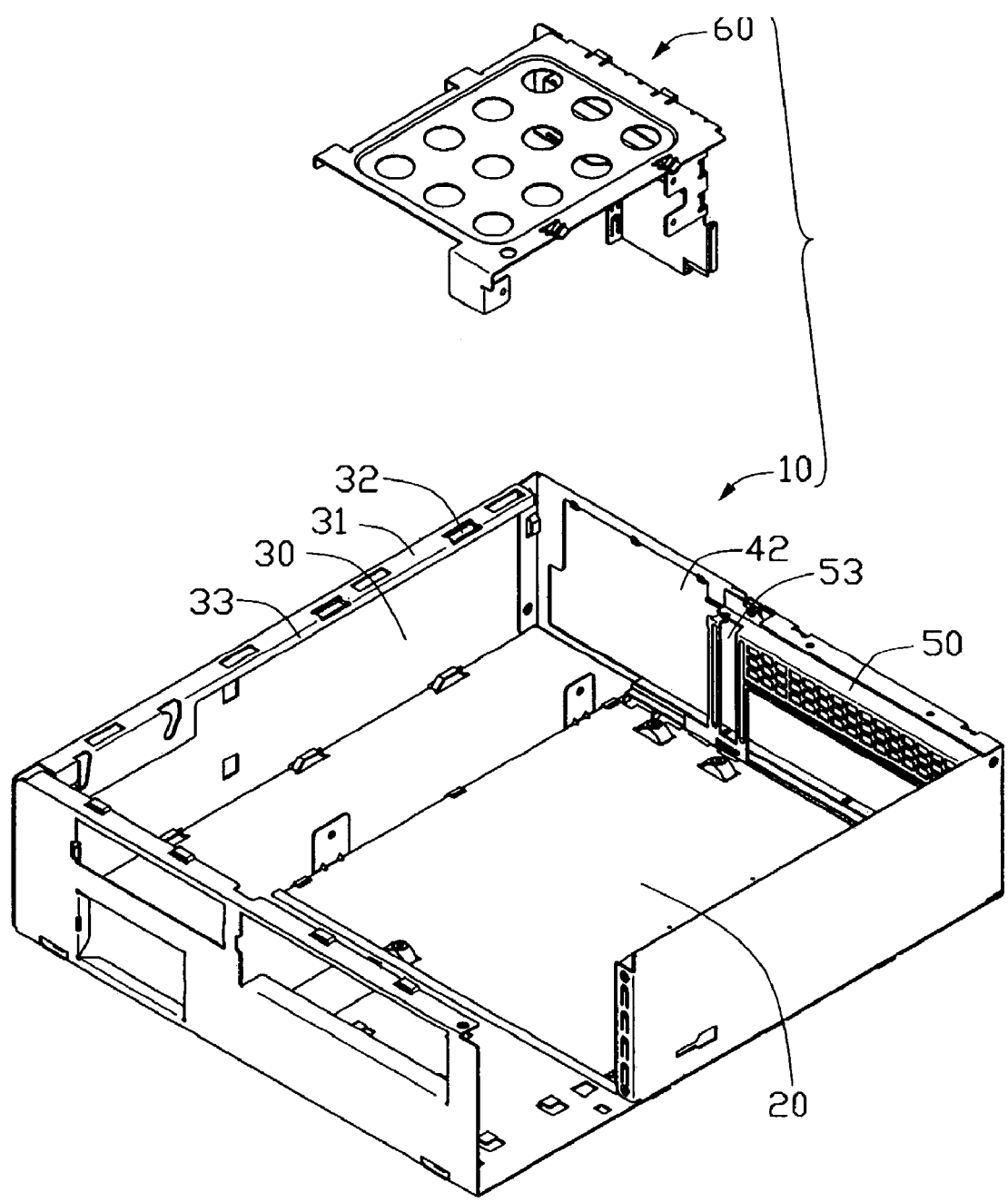
FIG. 2 is similar to FIG. 1, but viewed from another aspect.
Figure 3:
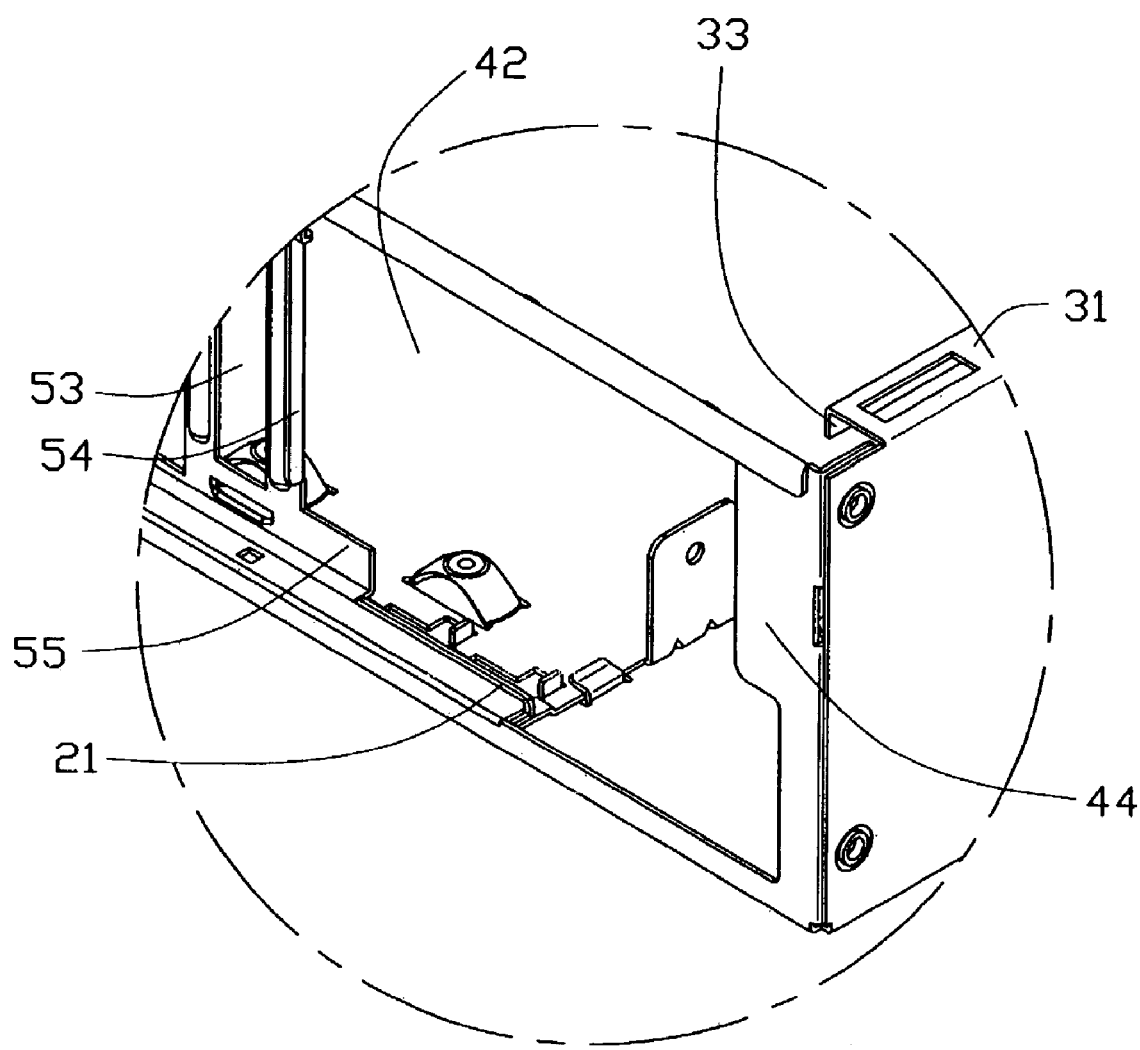
FIG. 3 is an enlarged view of an encircled portion III of FIG. 1.
Figure 4:
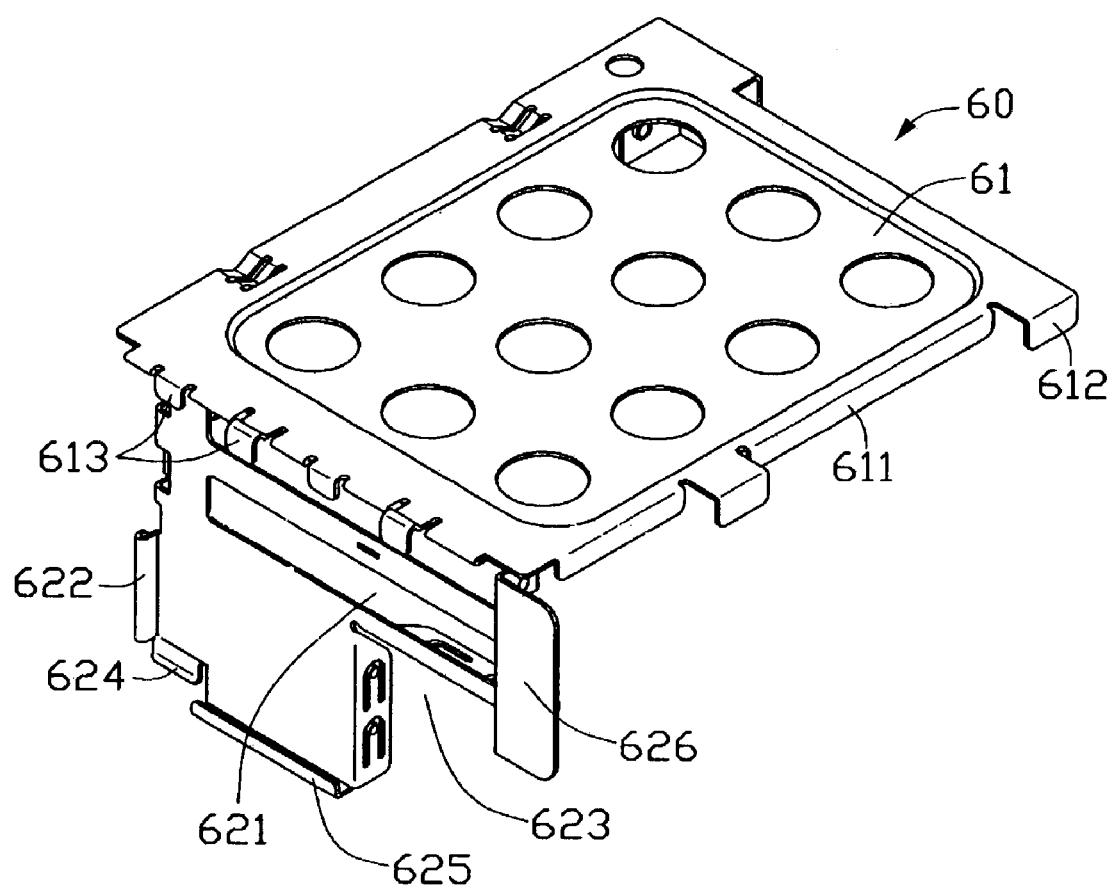
FIG. 4 is an enlarged view of the second mounting bracket of the computer enclosure of FIG. 1.

Referring to FIGS. 1 through 4, a desktop computer enclosure in accordance with a preferred embodiment of the present invention comprises a chassis 10, and respective first and second mounting brackets 50, 60 attached to the chassis 10.

The chassis 10 comprises a bottom panel 20, and respective side and rear panels 30, 40 extending upwardly from two contiguous sides of the bottom panel 20. A rib 21 extends upwardly from the bottom panel 20, parallel to and near the rear panel 40. A top ledge portion 31 is bent inwardly from the side panel 30. A pair of latch slots 32 is defined in the top ledge portion 31. A flange 33 depends from a distal edge of the top ledge portion 31. The rear panel 40 defines a horizontal opening 42 therein. An upper portion of one side of the rear panel 40 adjacent the opening 42 defines an engaging portion 44.

The first mounting bracket 50 is attached to the rear panel 40 using fasteners such as screws. The first mounting bracket 50 spans from an edge of the bottom panel 20 that is distal from the side panel 30 to a portion of the bottom panel 20 that is near the side panel 30. A rear end of the first mounting bracket 50 abuts the rib 21 of the bottom panel 20. A horizontal aperture 51 is defined in the first mounting bracket 50, coinciding with the opening 42 of the rear panel 40. The horizontal aperture 51 is for providing connectivity to components inside the computer; for example, for receiving I/O (input/output) ports. A vertical expansion slot 53 is defined in the first mounting bracket 50 adjacent the horizontal aperture 51, coinciding with the opening 42. The vertical expansion slot 53 can be covered over by a slot cover (not shown) of a corresponding expansion card (not shown) received in the enclosure. In alternative embodiments of the first mounting bracket 50, two or more vertical expansion slots 53 may be provided. A bent plate 54 extends rearwardly from a side edge of the first mounting bracket 50 adjacent the vertical expansion slot 53. A blocking tab 55 extends upwardly from the rear end of the first mounting bracket 50 adjacent the bent plate 54.

The second mounting bracket 60 is made from a single piece of metal plate, and comprises a horizontal top plate 61 and a vertical rear plate 62 bent forwardly and then downwardly from a rear end of the top plate 61.

A flange 611 depends from a lateral side of the top plate 61, corresponding to the flange 33 of the side panel 30. A pair of latches 612 extends outwardly and then downwardly from said lateral side of the top plate 61, corresponding to the latch slots 32 of the side panel 30. Four catches 613 are formed at the rear end of the top plate 61. Each catch 613 has a generally L-shaped profile, and comprises a horizontal portion and a vertical portion. Two outer of the catches 613 have slightly longer horizontal portions than two inner of the catches 613. Thus the vertical portions of the outer catches 613 are offset slightly from the vertical portions of the inner catches 613.

A pair of horizontal expansion slots 621 is defined in a top portion of the vertical rear plate 62. Each horizontal expansion slot 621 can be covered over by a slot cover (not shown) of a corresponding expansion card (not shown) received in the enclosure. One end of the vertical rear plate 62 is rolled to form a hook 622, corresponding to the bent plate 54 of the first mounting bracket 50. A stop plate 626 extends from an opposite end of the vertical rear plate 62, corresponding to the engaging portion 44 of the rear panel 40. A stop portion 625 extends rearwardly from a middle part of a bottom edge of the vertical rear plate 62, corresponding to the rib 21 of the bottom panel 20. A projection 624 extends slightly rearwardly and then downwardly from the bottom edge of the vertical rear plate 62, generally between the stop portion 625 and the hook 622. The projection 624 corresponds to the blocking tab 55 of the first mounting bracket 50. A cutout 623 is defined in a bottom corner of the vertical rear plate 62, generally between the stop portion 625 and the stop plate 626.

Figure 5:
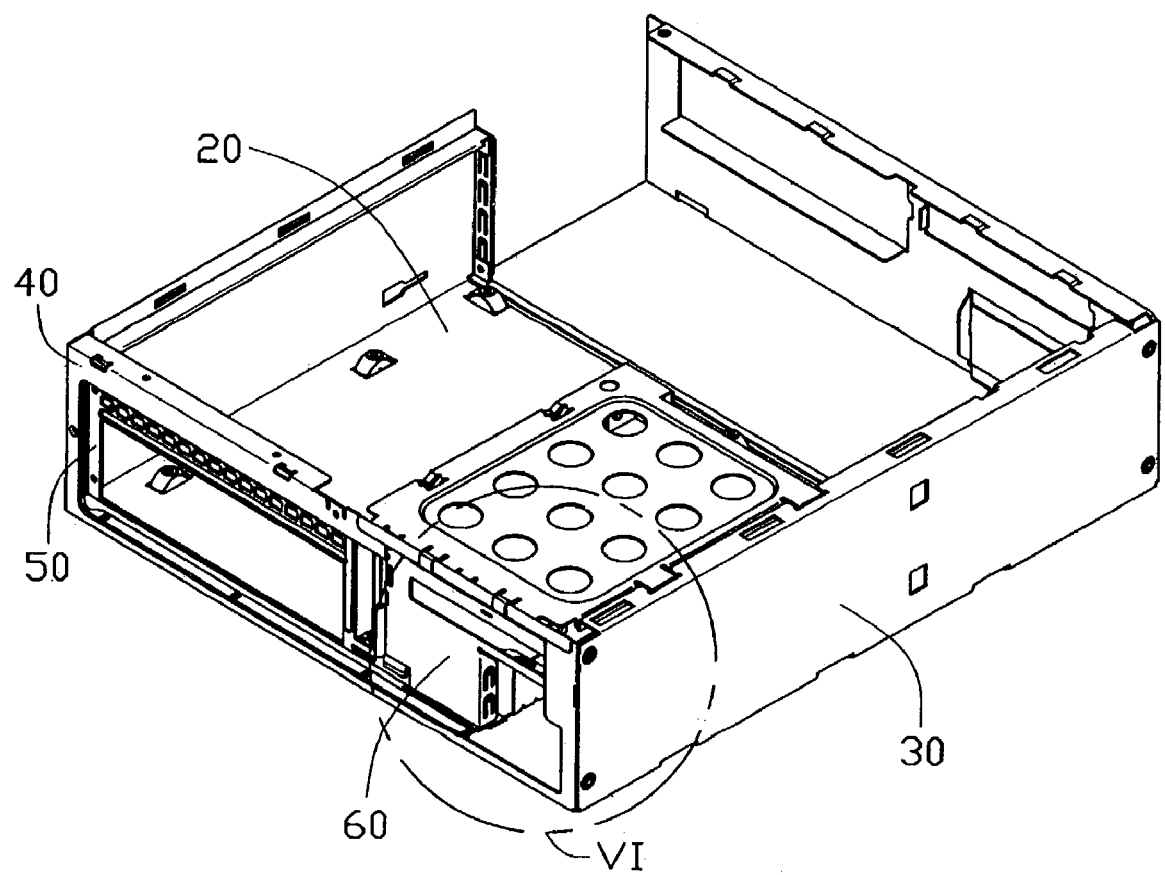
FIG. 5 is an assembled view of FIG. 1.
Figure 6:
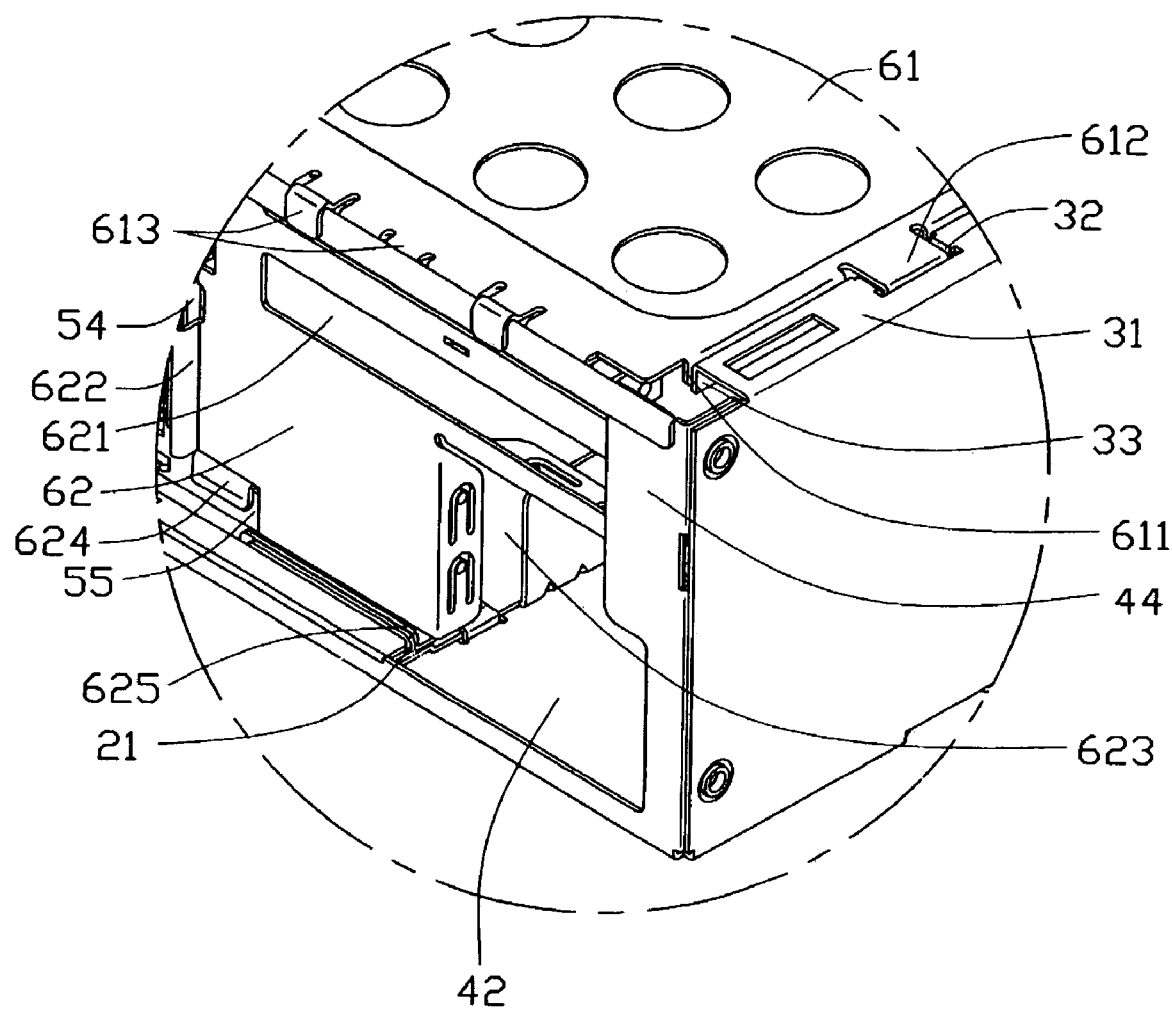
FIG. 6 is an enlarged view of an encircled portion VI of FIG. 5.

Referring also to FIGS. 5 and 6, in assembly, the second mounting bracket 60 is positioned above the chassis 10. The hook 622 of the vertical rear plate 62 of the second mounting bracket 60 is aligned with the bent plate 54 of the first mounting bracket 50. The second mounting bracket 60 is moved downwardly such that the hook 622 slidingly receives the bent plate 54, and the catches 613 engagingly receive a top edge portion of the rear panel 40 therebetween. That is, the top edge portion of the rear panel 40 is sandwiched between the outer catches 613 and the inner catches 613. Simultaneously, the latches 612 of the top plate 61 engage in the latch slots 32 of the side panel 30 respectively, and the flange 611 of the top plate 61 abuts against the flange 33 of the side panel 30. Thus the second mounting bracket 60 is prevented from moving relative to the chassis 10 in first directions that are perpendicular to the side panel 30. In addition, the stop plate 626 abuts against an inner surface of the engaging portion 44 of the rear panel 40, the stop portion 625 of the vertical rear plate 62 abuts against an inner surface of the rib 21 of the bottom panel 20, and the projection 624 engages with an outer surface of the blocking tab 55 of the first mounting bracket 50. Thus the second mounting bracket 60 is prevented from moving relative to the chassis 10 in second directions that are perpendicular to the rear panel 40. When a top panel (not shown) of the enclosure is attached to the chassis 10, the second mounting bracket 60 is prevented from moving relative to the chassis 10 in third directions that are perpendicular to both the first and second directions. Thus, the second mounting bracket 60 is securely and reliably mounted to the chassis 10.

The cutout 623 of the second mounting bracket 60 coincides with the opening 42 of the rear panel 40. Components such as a power supply (not shown) can be installed in the chassis 10 at the cutout 623.

In the enclosure of the present invention, vertical expansion slots 53 are defined in the first mounting bracket 50, and horizontal expansion slots 621 are defined in the second mounting bracket 60. Expansion cards of normal height can be installed in the enclosure at the vertical expansion slots 53, and expansion cards of great height can be installed in the enclosure at the horizontal expansion slots 621. Therefore, there is no need to reserve extra space for expansion cards of great height. Accordingly, a size of the enclosure is effectively reduced.

In the above-described preferred embodiment of the present invention, the first mounting bracket 50 is a separate component prior to its attachment to the rear panel 40. In an alternative embodiment, the first mounting bracket 50 may instead be integrally formed with the rear panel 40. In such embodiment, the vertical expansion slot 53 is defined in the rear panel 40. The bent plate 54 and the blocking tab 55 are formed on the rear panel 40.

Sizes of the vertical and horizontal expansion slots 53, 621 can be configured to meet the needs of particular applications of the enclosure.

In the above-described preferred embodiment of the present invention, the enclosure is a desktop computer enclosure. In an alternative embodiment, the first and second mounting brackets 50, 60 can be used in a tower computer enclosure.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
   a chassis comprising a first panel with a first expansion slot defined therein;
   a bracket located at inner side of the first panel, the bracket defining a second expansion slot therein perpendicular to the first expansion slot; and
   latching means formed on the bracket for latching the bracket to the chassis; wherein
   the bracket comprises a first plate and a second plate depending from a side of the first plate and parallel to the first panel, and the second expansion slot is defined in the second plate; wherein
   the first panel comprises a bent plate, and the latching means comprises a hook at one end of the second plate, the hook slidably and engagingly receiving the bent plate.

2. The computer enclosure as described in claim 1, wherein the latching means comprises a plurality of generally L-shaped catches at a same side of the first plate engaging with a top portion of the first panel, each of the catches having a horizontal portion and a vertical portion, at least one of the catches having a slightly longer horizontal portion than one or more of the other catches so as to sandwich the top portion of the first panel with said one or more of the other catches.

3. The computer enclosure as described in claim 1, wherein the first panel defines an engaging portion at one side thereof, and the latching means comprises a stop plate at one end of the second plate, the stop plate abutting the engaging portion.

4. The computer enclosure as described in claim 1, wherein the first panel comprises a blocking tab, and the latching means further comprises a projection at a bottom side of the second plate, the projection engaging with the blocking tab.

5. The computer enclosure as described in claim 4, wherein the first panel further comprises another bracket mounted thereto, the first expansion slot is defined in said another bracket, and the bent plate and the blocking tab are provided on said another bracket.

6. The computer enclosure as described in claim 1, wherein the chassis further comprises second and third panels, and the first and second panels extend from contiguous sides of the third panel respectively.

7. The computer enclosure as described in claim 6, wherein the second panel defines a plurality of slots at a top portion thereof, and the latching means comprises a plurality of latches at a side of the first plate, the latches engaging in the slots respectively.

8. The computer enclosure as described in claim 7, wherein flanges depend from the first plate and the second panel respectively, and the flanges abut each other.

9. The computer enclosure as described in claim 6, wherein the third panel comprises a rib near the first panel, and the latching means comprises a stop portion at a bottom of the second plate, the stop portion abutting the rib.

10. A computer enclosure comprising:
a chassis comprising a bottom panel, and side and rear panels extending from sides of the bottom panel respectively, the rear panel defining an opening;
a first bracket attached to the rear panel at one portion of the opening, the first bracket defining a first expansion slot in communication with the opening; and
a second bracket located at another portion of the opening, the second bracket defining a second expansion slot in communication with the opening and perpendicular to the first expansion slot, the second bracket further comprising latching means latching the second bracket to the chassis.

11. The computer enclosure as described in claim 10, wherein the second bracket comprises a first plate and a second plate depending from a side of the first plate, and the second expansion slot is defined in the second plate.

12. The computer enclosure as described in claim 11, wherein the latching means comprises a plurality of generally L-shaped catches at a same side of the first plate engaging with a top portion of the rear panel, each of the catches having a horizontal portion and a vertical portion, at least one of the catches having a slightly longer horizontal portion than one or more of the other catches so as to sandwich the top portion of the rear panel with said one or more of the other catches.

13. The computer enclosure as described in claim 11, wherein the first bracket comprises a bent plate, and the latching means comprises a hook at a side of the second plate slidably and engagingly receiving the bent plate.

14. The computer enclosure as described in claim 13, wherein the rear panel defines an engaging portion at one side thereof, and the latching means further comprises a stop plate at an opposite side of the second plate abutting the engaging portion.

15. The computer enclosure as described in claim 11, wherein the first bracket comprises a blocking tab, and the latching means comprises a projection engaging with the blocking tab.

16. The computer enclosure as described in claim 11, wherein the side panel comprises a top ledge portion with a plurality of slots defined therein, and the latching means comprises a plurality of latches at a side of the first plate, the latches engaging in the latch slots.

17. The computer enclosure as described in claim 11, wherein the bottom panel of the chassis comprises a rib parallel to and near the rear panel, and the latching means comprises a stop portion abutting the rib.

18. A computer enclosure comprising:
a chassis defining a bottom panel with a rear panel and a side panel extending upwardly from rear and side periphery thereof, the bottom panel, the rear panel and the side panel being perpendicular to one another;
an opening formed in said rear panel and surrounded by a frame structure defined by upper, lower and two side edge sections thereof;
a bracket including a top horizontal plate and a rear vertical plate;
at least one catch formed around a junction of vertical plate and said horizontal plate;
at least one projection formed around a lower edge of the vertical plate;
at least one hook formed around one side of the vertical plate; and
at least one stop plate formed around the other side of the vertical plate; wherein
the bracket is downwardly assembled to the chassis to have the catch, the projection, the hook and the stop plate respectively engage the corresponding upper, lower, and two sides edge sections of said frame structure.

19. The enclosure as described in claim 18, wherein said horizontal plate includes at least one latch latchably engaged with a top portion of the side panel.

* * * * *